Jan. 12, 1937.  M. L. HASELTON  2,067,187
ELECTRICAL INDICATING MEANS
Filed May 11, 1928  8 Sheets-Sheet 7

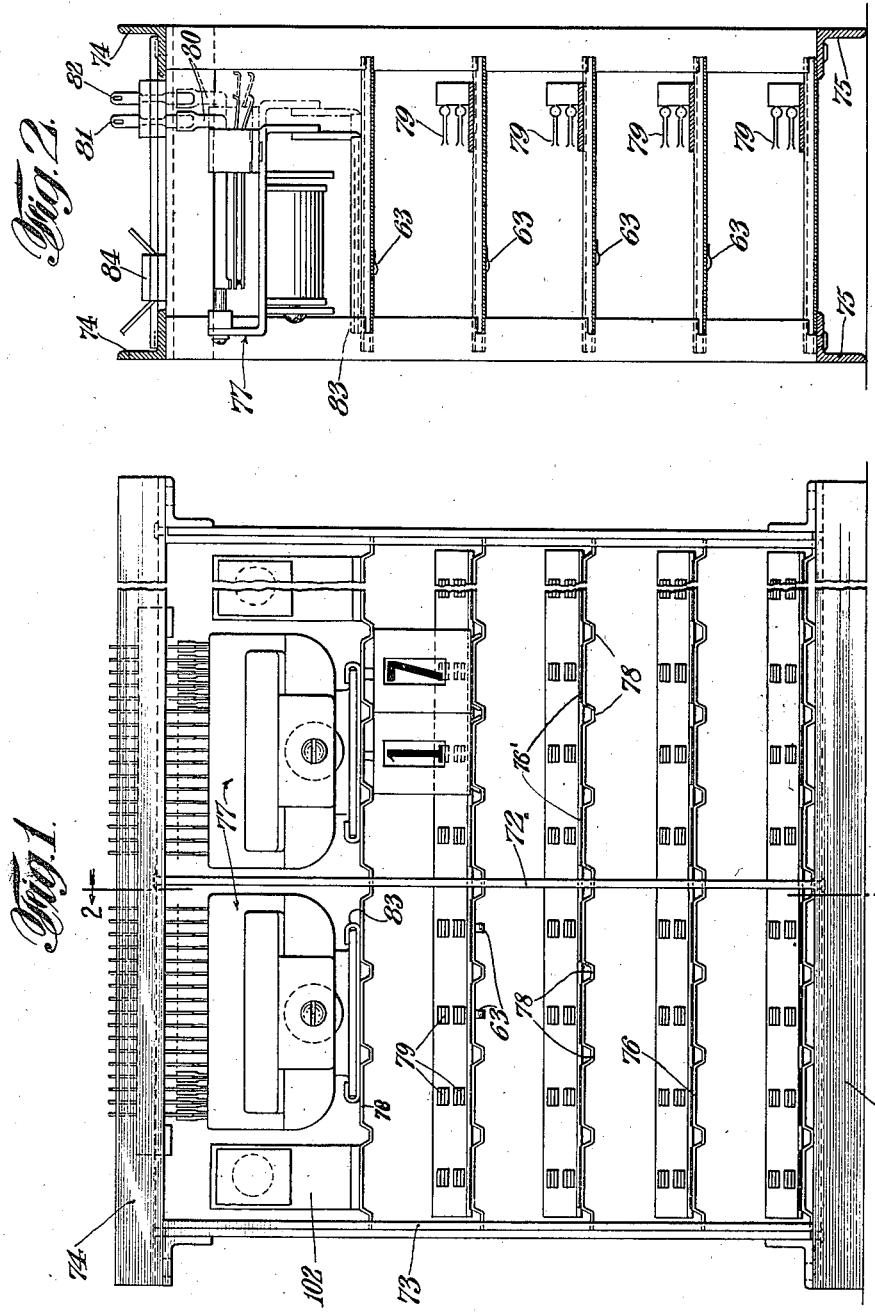

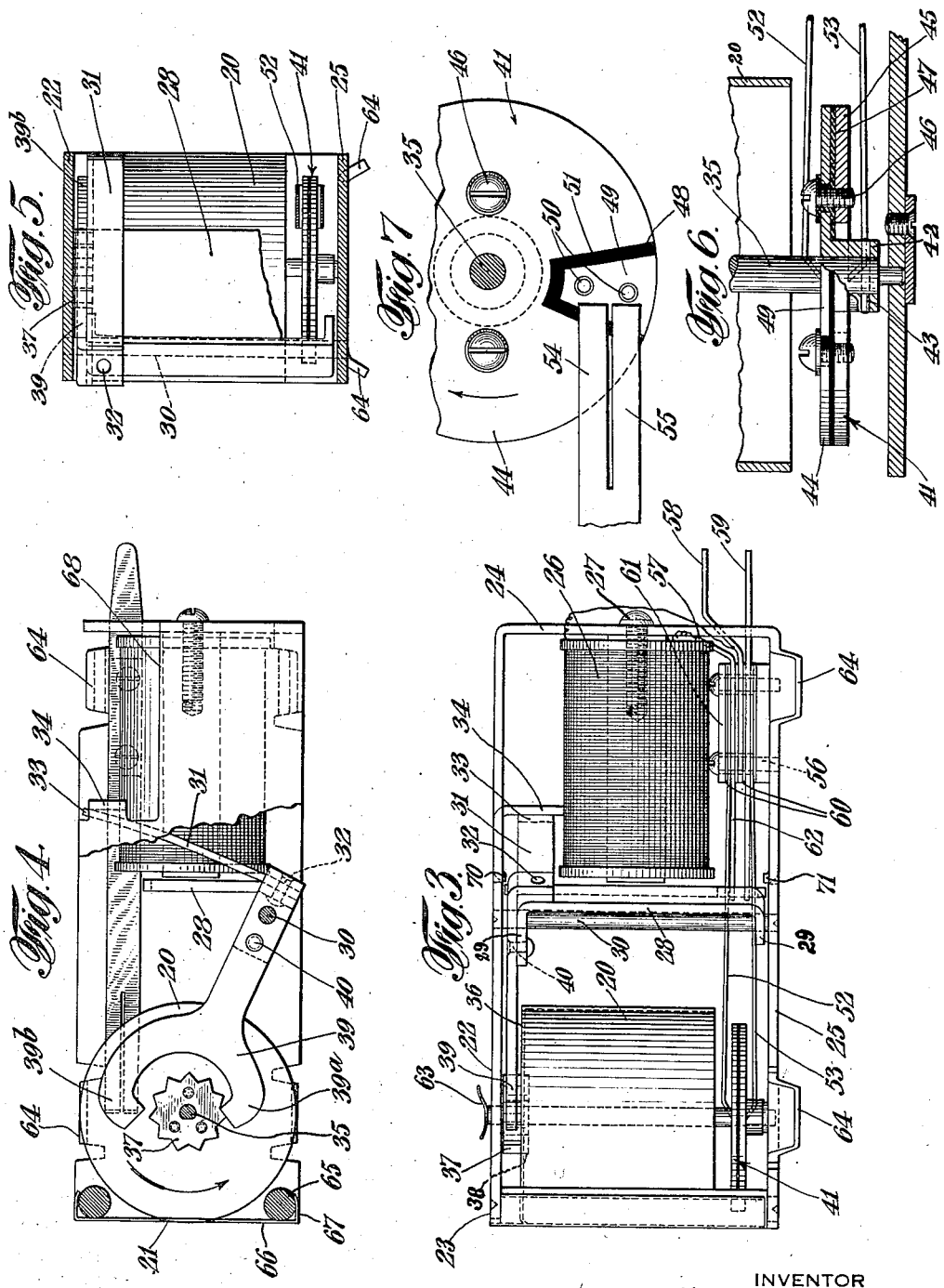

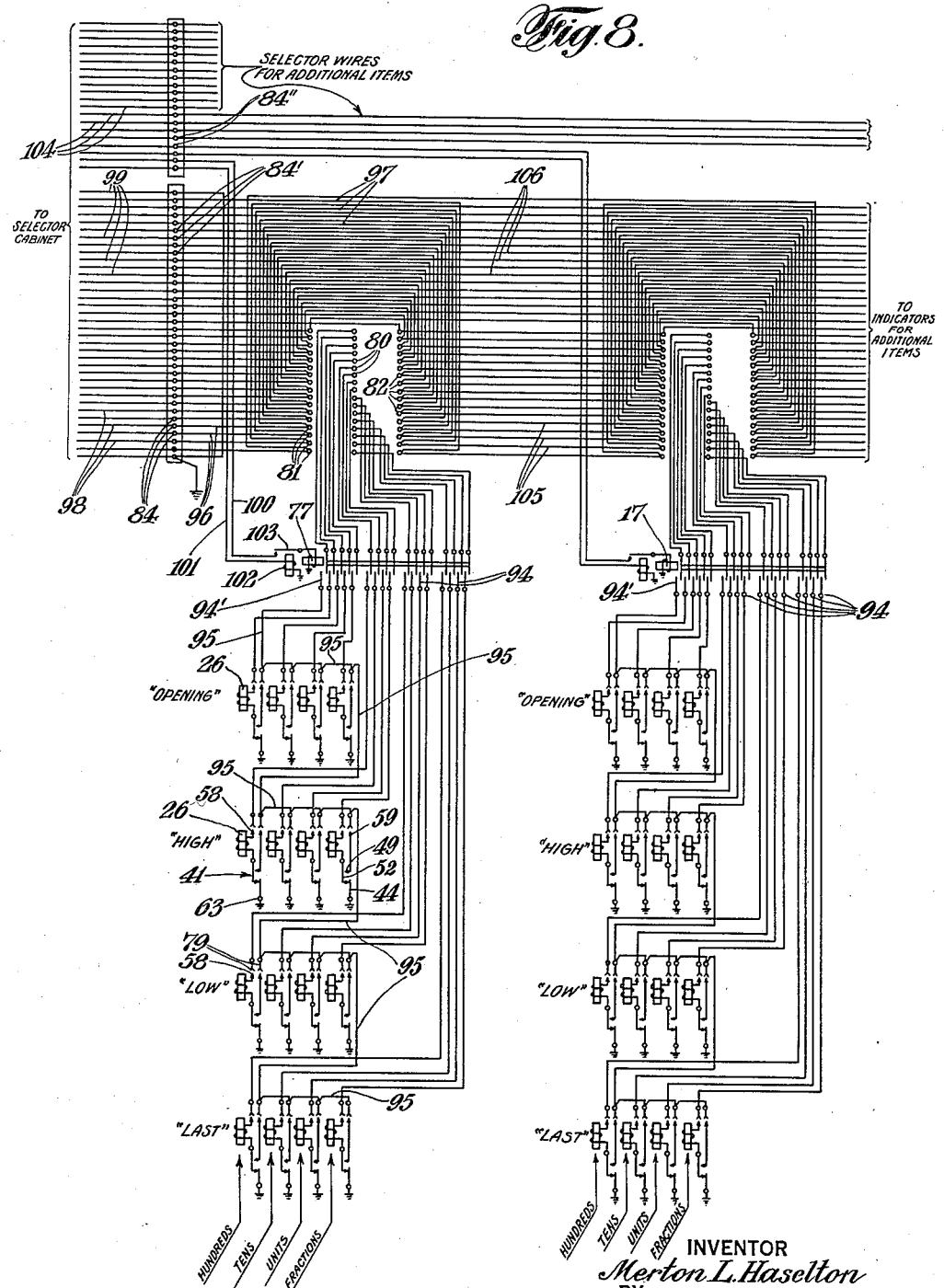

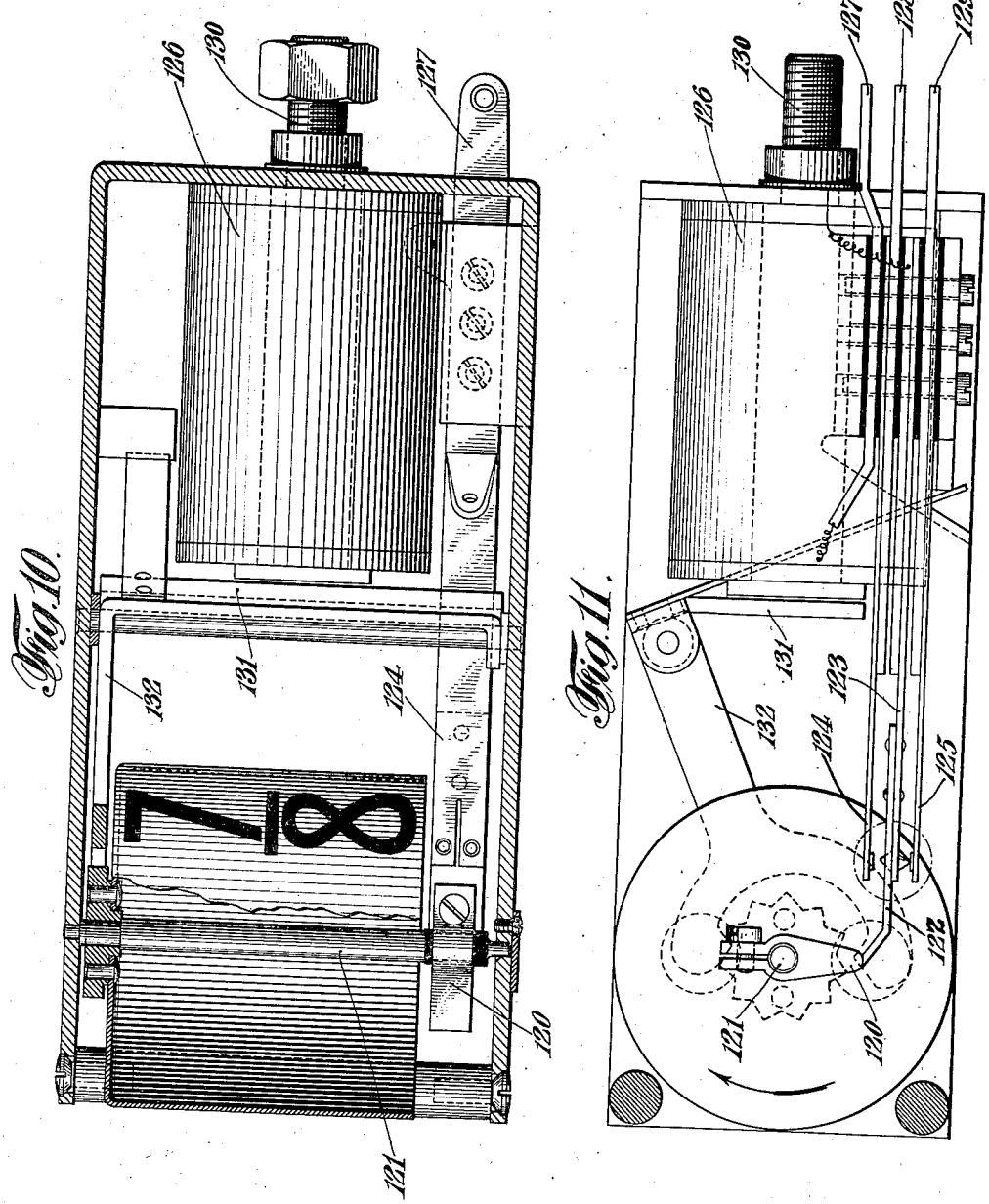

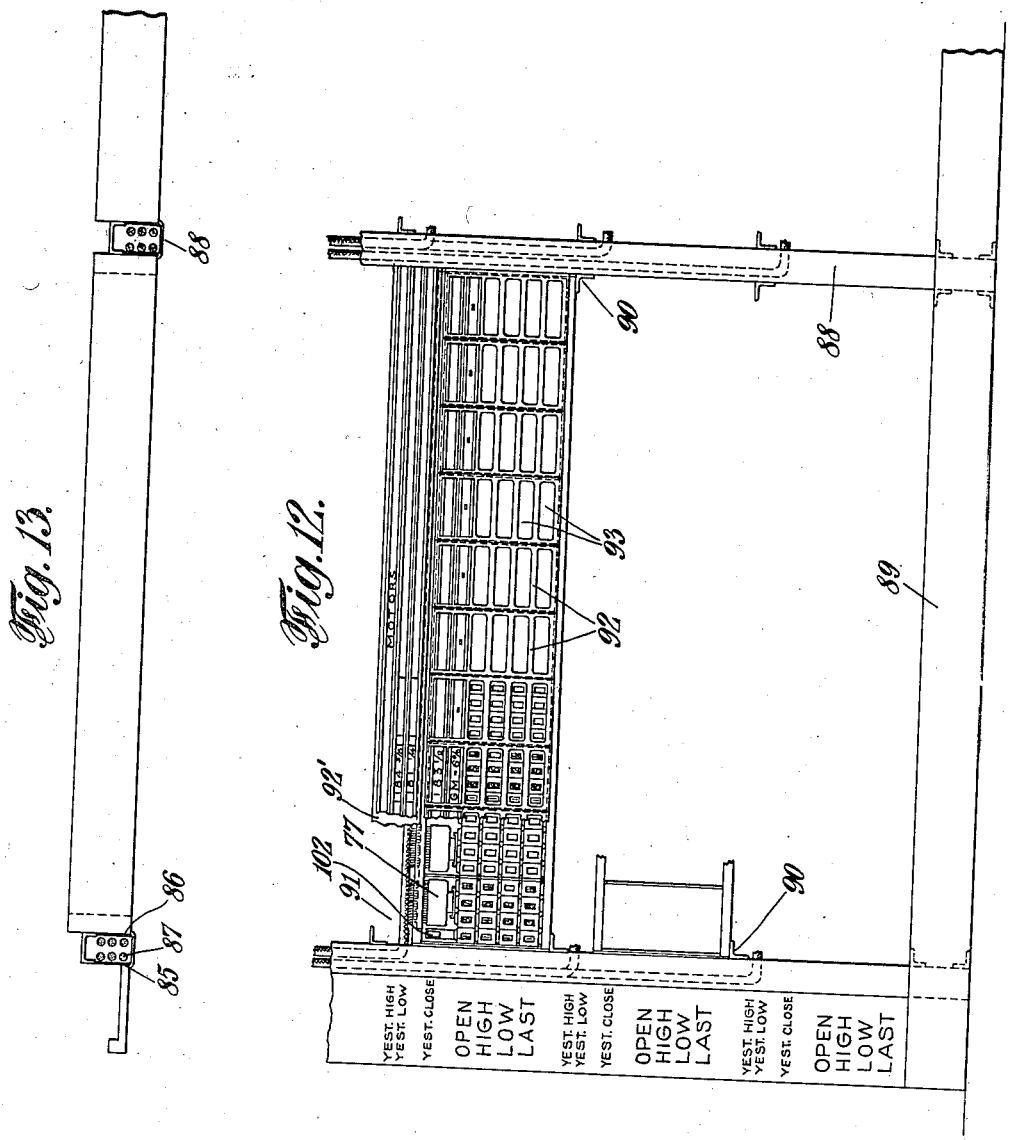

INVENTOR.
Merton L. Haselton
BY
Ward + Crosby
ATTORNEYS

Jan. 12, 1937.                M. L. HASELTON                2,067,187
                        ELECTRICAL INDICATING MEANS
                           Filed May 11, 1928         8 Sheets-Sheet 8
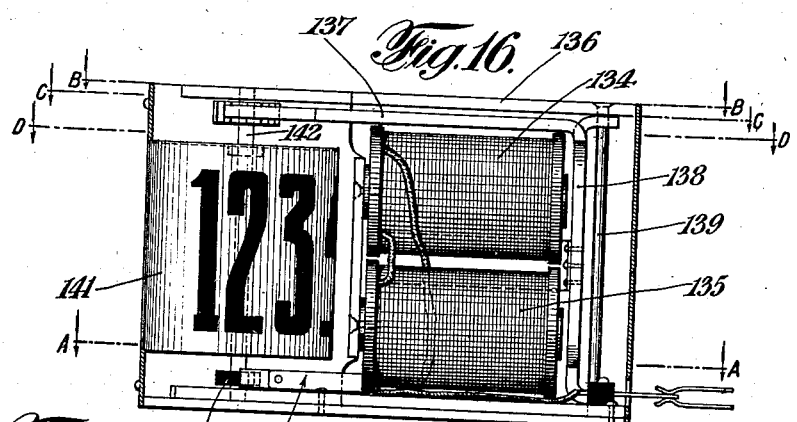
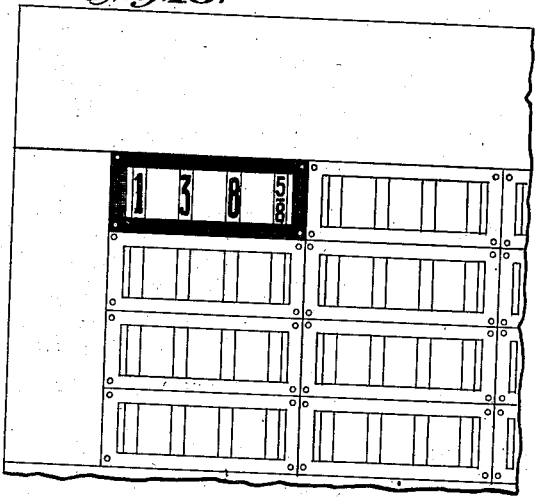
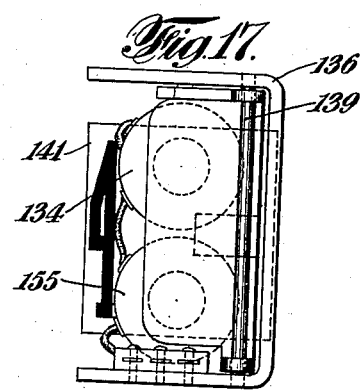
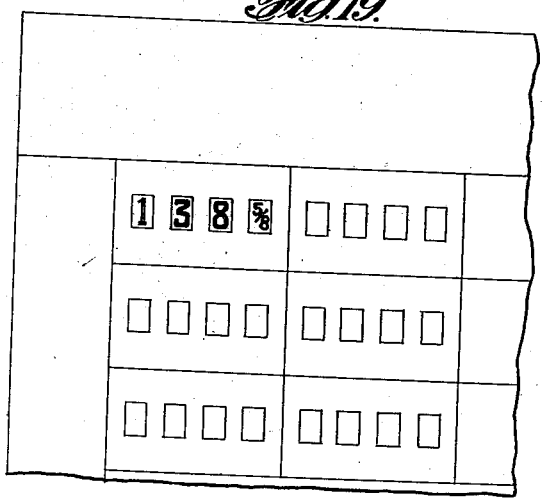
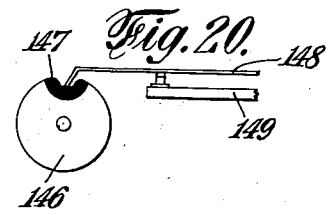
INVENTOR.
Merton L. Haselton
BY Ward & Crosby
ATTORNEYS Patented Jan. 12, 1937

2,067,187

UNITED STATES PATENT OFFICE 2,067,187

ELECTRICAL INDICATING MEANS

Merton L. Haselton, New York, N. Y., assignor, by mesne assignments, to The Teleregister Corporation, New York, N. Y., a corporation of Delaware Application May 11, 1928, Serial No. 276,883

3 Claims. (Cl. 177—326)

This invention relates to electrical indicating means. According to certain of its phases, although not limited thereto, the invention more specifically relates to electromagnetically driven rotatable indicating devices adaptable to the posting of varying stock quotations or other information. Other phases of the invention relate to means for mounting such indicators and also electrical circuit connections therefor. The objects of this invention include the provision of apparatus and arrangements of the above indicated class which will be of a simple and durable construction and accurate and very rapid in operation.

Further and more specific objects, features and advantages will more clearly appear from the detailed description given below taken in connection with the accompanying drawings which form a part of this specification.

The invention consists in the novel features of construction, arrangements, combinations of parts and electrical connections as hereinafter described, but by way of example only, as being illustrative of preferred embodiments of the invention.

In the drawings, Fig. 1 is a front elevational view showing one embodiment of the invention adaptable for use as a broker's automatic stock quotation indicating board. This figure shows a section, partly broken away, of such a board with certain cover plates and electrical connections removed;

Fig. 2 is a sectional view taken substantially along the line 2—2 of Fig. 1;

Fig. 3 is a side elevational view of one form of indicating unit adaptable to the construction shown in Fig. 1;

Fig. 4 is a top plan view partly broken away of the indicator unit of Fig. 3;

Fig. 5 is a transverse sectional view of Fig. 4;

Figs. 6 and 7 are enlarged detailed views illustrating the construction of a commutator which may be used in the device of Fig. 3;

Fig. 8 is a diagram showing the electrical connections for a broker's board as of Fig. 1;

Figure 9:
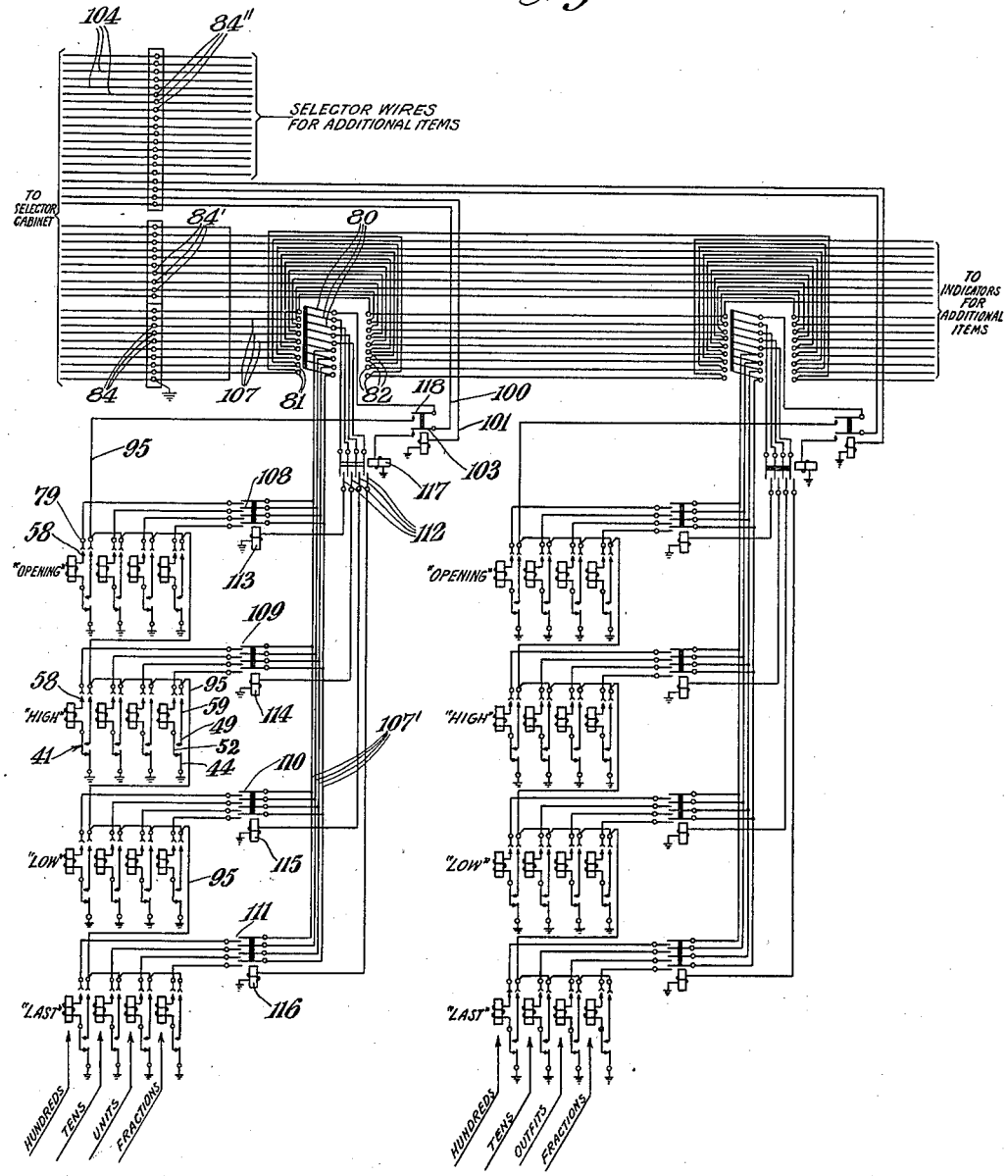
Fig. 9 is similar to Fig. 8, but showing another possible arrangement of the circuit connections.

Figs. 10 and 11 respectively are elevational and plan views of another form of indicator unit;

Figs. 12 and 13 respectively are front and top views of a frame construction for carrying the broker's board sections as of Fig. 1; and Figs. 14–20 inclusive illustrate still another embodiment of the invention.

The indicator unit as shown in Figs. 3–7 inclusive will first be described. The characters to be exhibited, such as price quotation digits, or letters, may be arranged around the periphery of a rotatable drum member as at 20. For example, if digits are to be posted, numerals from 1–9, 0, and a blank or "normal" position space may be successively arranged around the periphery of this drum so that such numerals may be exhibited one at a time at the front of the indicator through an opening 21 when the drum is rotated.

A plurality of these indicator units may be arranged side by side so that a group of the units, for example, will exhibit the various digits such as the hundreds, tens, units and fraction digits of a quotation. Also, when the invention is applied to brokers' boards, these units may be arranged in pluralities of groups so that each group exhibits the quotations for one stock, and each sub-group may exhibit one individual quotation such as the "open", "high", "low" or "last" of a particular stock. This invention is particularly adaptable to brokers' quotation boards or the like apparatus, such as shown in the copending application of Robert L. Daine and René Guyé, Ser. No. 246,474, filed January 13, 1928. Also, if desired, this invention is readily adaptable for use in apparatus embodying the invention of the patent of Robert L. Daine, No. 1,658,516, issued February 7, 1928. The indicators may be controlled over circuit arrangements such as shown in the following copending applications:

Merton L. Haselton, Ser. No. 244,873, filed January 6, 1928; Merton L. Haselton, Ser. No. 248,069, filed January 20, 1928; Merton L. Haselton and Page S. Haselton, Ser. No. 256,160, filed February 23, 1928.

The indicator drums 20 may be rotated with a step by step movement, such movement in the example shown being always in the same direction as indicated by the arrow in Fig. 4. The drum 20 may be mounted within a frame member 22. If desired, this frame member may be formed of a single piece of suitable magnetic sheet material and extending from the top front portion 23 of the unit, thence along the top of the unit and downwardly as at 24 to form the rear of the unit and thence along the bottom of the unit as at 25.

Within the rear portion of this frame, an operating magnet as at 26 may be mounted in a horizontal position, the rear end of its pole piece being secured as by a screw 27 to the rear frame portion 24.

The magnet 26 is arranged to cooperate with an armature member 28, which may be provided with a pair of lugs as at 29 pivotally mounted upon a shaft 30, which is in turn affixed at its ends within the top and bottom frame portions 22 and 25. The armature may be normally held in its retracted position by a leaf spring as at 31 riveted as at 32 to the armature member at one end, its other end at 33 resting against a lug member 34 struck downwardly from the top frame portion 22 and integrally formed therewith.

The drum 20 may be mounted upon a shaft as at 35, which in turn is rotatably mounted at its ends within the top and bottom frame portions 22 and 25. The drum itself may comprise a cylindrical stamping of sheet metal having one end wall as at 36 clamped between a star wheel 37 and a washer member 38. The star wheel may be fixed against rotation in respect to the shaft and the drum 20 may be riveted to the star wheel as shown, so as to also rotate with the shaft.

The star wheel 37 may be formed with a number of teeth equal to the number of characters or character spaces provided on the periphery of the drum (or an even multiple thereof), that is, in this instance, 11 in number. These teeth are designed to cooperate with an operating fork 39 which may be riveted as at 40 to the armature lug 29 so as to be movable in response to the operation of the armature 28. That is, the fork 39 oscillates about the pivoting shaft 30, together with the armature 28, when the magnet is impulsively energized. With the star wheel and fork of the particular shapes and relative dimensions substantially as shown, the same cooperate in a manner such that with each movement of the armature, the star wheel together with the drum member, is advanced always in the same direction through an angle subtended by the space between two teeth of the star wheel; that is, the drum is advanced one step each time that the magnet is energized by an electrical impulse. Thus, the drum is advanced through such an angle as to remove from exhibition one character and to exhibit the next succeeding numeral, character, or space. A desirable specific form of star wheel and fork construction is explained in further detail in the copending application of Ernest Frischknecht and Jean Abegglen, filed March 1, 1928, Ser. No. 258,219. In the particular form of construction here shown, it will be observed that the fork arm 39a is caused to engage the star wheel when the fork is moved by the operation of the armature, whereas the longer fork arm 39b is caused to engage the star wheel when the retracting spring 31 comes into play. With the parts shaped substantially as shown, the fork arm 39a while being moved by the magnet is in actual working engagement with the star wheel teeth during the major portion of its movement, in this particular instance, during approximately 53% of the time of such movement, so that the work done by the magnet in opposing the spring 31 and in moving the drum is efficiently distributed over a considerable portion of the period of movement. On the other hand, the working portion of the stroke of the fork arm 39b as operated by the spring 31, need not necessarily comprise such a large percentage of the total stroke for the reason that the work to be done by the spring is less than required of the magnet. The spring merely has to move the drum and does not have to flex a retracting spring in addition, as is done by the force of the magnet. In the particular construction illustrated, the actual working stroke of the fork arm 39b extends over approximately 42% of the total period of its stroke. That is, the fork arm 39b, under the influence of the spring 31, needs to be in actual working engagement with the star wheel during a relatively shorter portion of its period of movement.

It will also be observed that during the initial portion of the stroke of the fork, both when moved by the magnet and by the spring, the fork arms are free to acquire a considerable momentum before actually contacting with the star wheel so that the inertia of the drum is to a considerable extent overcome by the force of the impact of the fork arms against the star wheel teeth. Yet, it will be observed that the fork arm points, as well as the star wheel teeth, are so shaped that the impacts will take place between flat parallel surfaces of contact at the moments when the drum is started and when it is stopped. Also, the spring 31 being initially substantially straight, its tension during energization of the magnet will gradually increase from a very low value to its maximum value in a manner closely corresponding to the gradual increase of the electromotive force of the magnet as the armature approaches the pole piece. The star wheel and fork construction as illustrated represents a carefully adjusted balance of various mechanical factors and features including those above mentioned, in addition to others further explained and claimed in the application of Ernest Frischknecht, et al, above referred to.

The magnet 26 may be energized in various ways, but according to the preferred embodiment of the invention, two different circuits are provided respectively for the "actuation" of the drum to exhibit a new quotation and for the "restoration" movement of the drum preparatory to the "actuation" thereof.

A commutator as at 41 mounted upon the drum shaft 35 may be provided to automatically connect and disconnect these circuits at the proper times. The constructional details of this commutator as shown in Figs. 6 and 7 will now be explained. A hub member 42 fixed to the shaft 35 as by a pin 43 comprises the supporting frame for the commutator parts and is also formed with a disc shaped contact portion 44. Another disc shaped contact member 45 may be secured to the member 44 as by screws 46 and insulated therefrom by an insulation piece 47. As shown in Fig. 7, a sector of the contact portion 44 may be cut away as at 48 and, within the space thus provided, a sector contact 49 may be inserted and secured in place and electrically connected to the contact 45 by rivets as at 50. Insulation as at 51 may be provided between the sector 49 and the contact portion 44.

A pair of spring brushes 52 and 53 are arranged to engage the opposite faces of the commutator 41. As indicated in Fig. 7, these brushes are preferably formed with bifurcated or double contact portions as at 54 and 55 to insure continuous contact at the desired times without danger of sparking. The brushes may be fixed to the lower frame portion 25 as by screws 56, which also serve to affix to the frame portion three connection or contact members 57, 58 and 59. The contact members 57 and 59 respectively are clamped flatwise against the brushes 52 and 53 in electrical contact therewith, but otherwise the brushes and contact members secured by the screws 56 may be insulated from one another by layers of insulation as at 60. The top layer of insulation may be surmounted by a clamping piece 61. As shown in Fig. 3 the brushes 52 and 53 may preferably extend substantially straight forwardly from their clamped areas to the commutator. With the brushes thus formed straight (except for their contacting tips) they may be readily standardized with a high degree of uniformity so as to engage the commutator with the proper pressure with little or no adjustment after assembly of the device. The contact members 58 and 59 as shown may extend beneath the clamping means and thence a considerable distance toward the commutator, as shown at 62, to provide protective means limiting the possible bending of the brushes and preventing the flexure of the brushes from being too concentrated at the clamping means. The contacts 57 and 58 as shown may be connected respectively to the two ends of the magnet winding, while the contact 59 is connected to the brush 53. With these connections one end of the magnet winding may always be connected with an outside circuit through the contact 58, while the other end of the magnet winding may be grounded through the commutator or alternatively connected through the commutator to an outside circuit through contact 59. That is, when the brush 52 contacts with the sector 49, the circuit from contact 57 extends through this brush, sector 49, commutator contact 45, brush 53, to contact 59. However, when the brush 52 is in contact with the commutator contact portion 44, the brush 53 is inactive since the contact portion 44 is grounded through the shaft 35 and thence through the frame parts, or if desired, through a grounding spring contact as at 63 slidably engaging the top of the shaft in a manner hereinafter explained in connection with the description of the indicator supporting frames.

The indicator units may therefore be operated as follows: The circuit of contact 58 may be impulsively energized, a return circuit being provided through the ground connection. However, when a sufficient number of impulses have occurred to move the drum 20 and the commutator 41 to a predetermined "normal" or zero position, the ground return circuit will be removed by reason of the contacting of the brush 52 with the sector 49. That is, the sector 49 may be positioned at such an angle in respect to the shaft 35 that when either a blank space or a desired normal position character is exhibited on the drum through the window 21, the sector will come into engagement with the brush 52, and thus open the grounded impulsing circuit and automatically stop the stepping movement of the drum at the predetermined desired position. The drum may then be advanced from this position only by energizing the circuit of contact terminal 59 with an impulse which will serve to advance the commutator and drum one step and restore the brush 52 into contact with the grounded contact member 44. Thereafter a sufficient number of impulses may be transmitted through the contact terminal 58 and the grounded return circuit, to advance the drum 20 to exhibit the desired new character. With this method of operation, a plurality of the indicator units may be readily restored to "normal" by a single impulse transmitter and each unit will automatically stop its stepping movement when it arrives at the desired normal position. Thereafter each of the units thus "restored" may be advanced independently to the desired new positions.

These indicator units may be readily mounted in frame members as shown in Fig. 1 so as to be quickly slid into place or removed from the front of the frame. The contact terminals 58 and 59 and also the grounding contact 63 provide quick-detachable connections cooperating with suitable contacts on the frame, as will be hereinafter described.

The lower frame portion 25 may be provided with lugs as at 64 struck outwardly and downwardly at a suitable angle to cooperate with guiding means in the supporting frame. At the front of the indicator unit the top and bottom frame portions may be secured in respect to each other by corner posts as at 65. A suitable mask as at 66 may be provided with spring flanges 67 at its edges for detachably engaging the posts 65. The window or opening 21 above referred to, may be provided in the mask 66, and as shown the drum is located so as to protrude slightly into the opening 21, thus clearly revealing the character to be exhibited but coming into close proximity of the edges of the opening so as to substantially completely shield the adjacent characters from observation even though the adjacent characters may directly adjoin the character to be exhibited.

The top frame portion 22 may be cut away as at 68 to provide easy access to the clamping screws 56 and associated parts. The rear frame portion 24 may be likewise cut away at this region for the same purpose and to permit the contact terminals to protrude.

It will be observed that the upper and lower edges of the armature 28 extend into close proximity of the upper and lower frame portions. Also the upper and lower frame portions may have inwardly struck lugs or ridges 70 and 71 respectively positioned directly above and below the end of the magnet core and in a generally parallel relationship with the upper and lower edges of the armature 28 and coextensive therewith. The frame member, being of suitable magnetic material, may therefore provide an efficient magnetic return circuit cooperating with the armature and the magnet pole piece with substantially the shortest possible air gaps for construction of this class. Also the ridges or lug portions 70 and 71 make it possible for the magnetic air gaps between the armature and the frame portions, to extend in the general direction of movement of the armature and therefore the magnetic flux in these gaps cooperates with the flux between the armature and magnet pole piece to efficiently operate the armature.

It is desirable to so position the contact sector 49 in respect to the star wheel teeth that the circuits of the brush 52 will never be broken at the brush when the magnet is energized, but will be broken when the drum is under the control of the retracting spring 31. In this manner the breaking of the actuating current at the commutator may be avoided with the consequent elimination of arcing.

The operating parts constructed in the manner above described may be accurately duplicated at a very low cost, as is commercially desirable, in view of the large number of units necessary, for example, in broker's indicating boards. With indicator drums of a suitable size for brokers' boards and light in weight, the stepping movement may be sufficiently rapid to accurately follow impulse frequencies of 20 to 30 per second or frequencies of the order of magnitude of commercial alternating current lighting circuit frequencies, if necessary.

The indicator section frames as shown in Figs. 1 and 2 will now be described in further detail. These frames may comprise upright members as at 72 located between the indicators for each stock or other quotation. If desired, a double upright member as at 73 may be provided at the ends of the sections. At the top and bottom of the sections these uprights may be interconnected by suitable horizontally extending angle irons as at 74 and 75. It will be observed that five horizontal shelves as at 76 are provided between each pair of uprights. Each of the lower four of these shelves is adapted to slidably receive four indicator units, that is, provision is made for a total of 16 indicator units in all for each stock, the quotations of which are to be posted. The first, second, third and fourth shelves respectively provide space for the "last", "low", "high" and "opening" price quotations.

If desired, the hundreds digit indicator for the "high", "low" and "last" quotations may be omitted with a substantial saving in expense. In that event, the hundreds digit indicator of the "opening" price quotation will indicate to the observer the proper hundreds digit for the "high", "low" and "last" prices or items. When these hundreds digit indicators are omitted, the spaces therefor may be filled with dummy boxes or if desired, a special form of indicator may be inserted in one of such spaces and arranged to give signals as to the prevailing activity of the market in the particular stock or other item in question. For example, in lieu of the hundreds digit indicator for the "last" quotation, an indicator unit as above described might be inserted having a dial bearing a series of different colored areas. Thereby such indicator unit may be operated step by step until a colored area is exhibited corresponding to the degree of activity of the market, assuming that a predetermined arbitrary color scale has been adopted for such purpose. The fifth or upper shelf 76 may provide a support for a multicontact relay as at 77, the function of which will be hereinafter explained, and also any other relays that may be there required for the operating circuits. It will be observed that each shelf is provided with four raised seating areas respectively for the four indicator units, these seating areas being interspaced with channelways as at 78 which are designed to be engaged by the guide lugs 64 formed on the indicator units as above described. Also, upon each of the four lower shelves groups of insulated female contact members as at 79 may be provided for engagement with the quick-detachable indicator unit terminal contacts 58 and 59 above described. The grounding contact 63 is also shown as mounted upon the lower surfaces of each of the four upper shelves. The shelf areas are preferably covered with layers of sound deadening material such as felt, as shown at 76'. The vertical front and rear frame members 72 and 73 and the horizontal shelves 76 are preferably notched, as shown in Figs. 1 and 2, to hold the shelves in position after the frame has been assembled.

With the above described frame construction, each of the indicator units may be readily slid into or out of the frame independently of the others to facilitate inspection, repair or replacement. In Fig. 2 it will be observed that the multicontact relay 77 is provided with a large plurality of terminal contacts as at 80. Two pairs of contacts 81 and 82 are mounted as shown upon the top of the section frame for alternative cooperation with the contacts 80. To shift the relay from contacts 81 to contacts 82, it is merely necessary to slide the relay along guideways as at 83 to the position indicated by dotted lines in Fig. 2. Additional groups of section terminal contacts may be provided at 84 at the top of the section. The purpose of these numerous contacts will be explained hereinafter in connection with Fig. 8.

A plurality of the section frames as of Figs. 1 and 2 may be arranged to form a broker's board in the manner shown in Fig. 12. That is, the section frames may be arranged in a plurality of tiers. The various tiers may be separated by channel members or by spaced-apart uprights as at 85 and 86. The electrical connections as at 87 to the various sections may be located between these uprights so as to be accessible from the front of the apparatus. These spaces may be covered by detachable vertically extending cover plates 88. The uprights may be secured to a suitable base member or frame as at 89. The indicator section frames may be supported from the uprights at the desired elevations by brackets as at 90. The sections of each tier are preferably separated by horizontally extending spaces as at 91 for receiving the electrical connections to the various indicator section contacts. The group of indicator units and associated parts for each separate stock or other item may be covered by removable cover plates as at 92 having apertures as at 93 for exhibiting each of the four quotations for the stock. It will be observed that elongated cover plates are provided at 92' to cover the spaces 91 so as to give the entire structure a finished appearance. Cover plates 92 and 92' also provide space for number cards showing yesterday's quotations and other information.

The electrical connections to the above described apparatus will now be explained. Fig. 8 shows the circuit connections for the quotation indicators for two stocks or other items on a broker's board. That is, the connections for a total of 32 indicator units are shown. The magnets 26 and parts of the commutator 41, namely the contacts 44, 45 and 49, as well as the terminal contacts 58, 63 and 79 as above described, are all diagrammatically shown. It will be observed that the multicontact relays 77 as above referred to are each provided with seventeen contacts, sixteen of which as at 94 respectively are individually electrically connected through corresponding contacts 79 to each of the indicator terminal contacts 58 of one stock. The seventeenth contact on the multicontact relays, designated by the numeral 94', is electrically connected to all of the indicator contact terminals 59 of the corresponding stock by means of connection wires 95. It will be observed that seventeen of the relay terminal contacts 80 are provided for alternatively engaging a corresponding number of the stationary contacts 81 or 82. The contacts 81 may be connected by bus wires as at 96 to a corresponding number of section terminal contacts 84 as above referred to. The contacts 82 may likewise be connected by bus wires as at 97 to a corresponding number of section terminal contacts 84'. The contacts 84 in turn are each connected to the operating busses 98 of one transmitter equipment, whereas the contacts 84' respectively may be connected to operating busses 99 of a duplicate transmitter equipment. That is, the indicators for each stock may be controlled over either the busses 98 of one system or channel, or over the busses 99 of a duplicate system or channel. To shift the indicators from one system or channel to another, it is merely necessary to slide the relay 77 in the manner above described into proper position, so that its terminals 80 contact either with the terminals 81 or terminals 82, as desired. The relays 77 are normally in open circuit condition, as indicated in Fig. 8, so that the circuits to all of the indicator units are normally open. For each stock a pair of selector wires as at 100 and 101 are provided, and the same may run to an interchangeable plug terminal board such as disclosed in the copending applications above referred to, and thence to suitable selector equipment. In order that the selector wire 100 may be normally in open circuit condition, a relay 102 may be provided in circuit with the selector wire 101 for controlling a normally open contact 103. When selector wire 101 is energized through relay 102 and a ground return as shown, the contact 103 will be moved to circuit closing position, whereupon if the selector wire 100 is also energized, its circuit will be completed through the relay 77 and a ground return. The multicontact relay will thereupon "pick up" and connect the indicator operating circuits to the control busses through the seventeen contacts 94 and 94'. Meanwhile, however, all of the other multicontact relays on the broker's board may remain in open circuit position so that the connections thereto will not interfere with those of the indicators for the particular selected stock. In the copending Haselton applications above mentioned, means are disclosed whereby any desired pair of selector wires as at 100 and 101 may be selectively and conjointly energized, thereafter groups of operating impulses being transmitted over operating busses such as indicated at 98 and 99. The selector wires 100 and 101 may be connected through section terminal contacts as at 84" to selector cables as at 104. All of the cables or wires 98, 99 and 104 may extend to a selector cabinet. The contacts 81 and 82 respectively may be interconnected to corresponding contacts for other stocks or items by "jumper" cable connections as at 106 and 105.

Fig. 9 diagrammatically illustrates circuit connections arranged whereby the use of relays having a large plurality of contacts is avoided, a number of relays having a smaller number of contacts being substituted. Corresponding parts in so far as possible in Figs. 8 and 9 are designated by the same numerals. However, the contacts 80, 81 and 82 in lieu of being associated with a relay, comprise the three groups of contacts of a double throw multi-pole switch as indicated. Also, in lieu of separate operating busses for each of the sixteen indicator units per stock. a total of nine operating busses as at 107 is here shown. The lower four of these busses, it will be observed, are connected through relay contacts as at 108 respectively to each of the "opening" quotation indicator unit terminals 58 by way of section frame contacts 79. These same four busses may also be connected respectively in multiple through relay contacts as at 109, 110 and 111 to the operating circuits of the "high", "low" and "last" indicator units. The next four operating busses 107 may be connected respectively through circuit opening relay contacts as at 112 to the four relays, 113, 114, 115 and 116, and thence to ground. The latter relays, it will be observed, control the contacts 108–111, so that either the "open", "high", "low", or "last" indicator units as desired may be operatively connected to the first lower four operating busses 107. That is, for example, if an opening quotation were to be given, the bus connected to relay 113 would be energized so as to close the contacts 108, or if for example, both a "low" and a "last" quotation were to be simultaneously posted, then relays 115 and 116 would both be energized so as to bring the four operating busses as at 107' into operative relationship with the proper indicator circuits through contacts 110 and 111. The selection of the indicators for the particular desired stock is accomplished by energizing selector wires 100 and 101 as in the embodiment above described. However, the closing of contact 103 in this instance serves to energize a relay 117 for controlling the contacts 112. The relay of contact 103 may also serve to control a contact 118 associated with connection wire 95 so that when a particular stock is chosen, the ninth or top bus wire 107 will be connected to the connection wire 95. It will be understood that the connection 95 (both in Fig. 8 and Fig. 9) which runs to all of the sixteen indicator units in common, is for the purpose of conveying the initial "actuating" impulse to such of the units as have been "restored" to normal as above explained.

While circuit connections are shown in Figs. 8 and 9 for only two stocks, it will be understood that the connections may be extended in a similar manner to the indicator units for many additional stocks or items. Indicator units for ten different stocks may be conveniently arranged in each frame section and a sufficient number of frame sections may be provided with each installation to exhibit the quotations for all stocks which are of particular interest to a broker or his customers.

In the embodiment of the indicator unit shown in Figs. 10 and 11, the commutator is replaced by a make and break switch construction controlled by a rotatable cam as at 120, mounted upon, but insulated from the drum shaft 121 and arranged for engagement with a contact operating piece 122 when the drum is in "normal" position. This contact operating piece is mounted upon a spring contact 123 which normally rests in contact with a contact 124, but when the cam 120 engages the piece 122, the circuit is shifted from contact 124 to contact 125. Contact 123 is connected to one terminal of a magnet 126, the other end of the winding of which is connected to a contact terminal 127. The contacts 124 and 125 respectively may be connected to terminal contacts 128 and 129, the contact 128 corresponding to the ground return contact in the embodiment above described, whereas the terminals 127 and 129 correspond respectively to the terminals 58 and 59 above referred to.

The pole piece of the magnet 126 may be extended as at 130 to provide a screw connection or mounting means for the unit if desired. The magnet armature as at 131 may be integrally formed with the operating fork 132. In other respects, the constructional features of this embodiment are either obvious from the drawings or may correspond to the embodiment first described.

Figure 14:
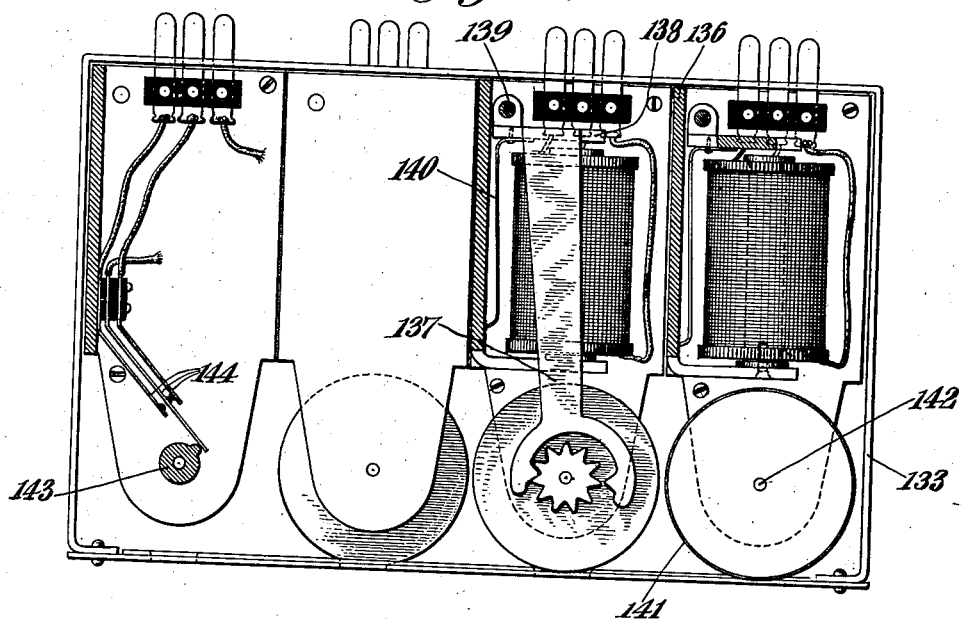

In the construction shown in Figs. 14–17 inclusive, four of the indicator units are shown mounted as a group within a frame member 133 so that the four indicators for one quotation may be handled as a unit if desired. In this embodiment it will be observed that pairs of magnets as at 134 and 135 are mounted upon frame members as at 136. Operating forks as at 137 extend to the rear of the magnets and are there provided with armature portions as at 138 pivoted on shafts as at 139 and provided with retracting springs as at 140. The sectional views shown of the four indicator units of Fig. 14, are taken respectively substantially along the lines A—A, B—B, C—C, and D—D as indicated in Fig. 16. The indicator drums 141 of this embodiment may be similar to those of the above described embodiments and mounted upon rotatable shafts as at 142. Switch operating insulation cam members as at 143 may be mounted upon the shafts 142 for controlling switch contacts 144 in substantially the same manner as the corresponding contacts shown in Figs. 10 and 11 are controlled.

Figure 15:

Fig. 15 illustrates one manner in which an effective contrast may be made between the figures on the indicator drums and the background of the broker's board. The dark figures are here shown on a light background area, the group of digits for each quotation being surrounded by a relatively dark border as at 145.

In all of the above described embodiments of the indicator unit, it will be observed that the figures or characters on the indicator drums are arranged with their vertical dimensions running parallel to the axis of the drums. That is, the drums are arranged to rotate on vertical axes, while heretofore it has been the general practice where groups of digit drums are assembled, to mount the same so that they rotate on horizontal axes. Digits, fractions and other characters of a given area may generally be made much more legible to the observer if the vertical dimension substantially exceeds the horizontal dimension or width. With such vertically elongated characters applied to groups of indicator drums mounted on vertical axes, according to this invention, many advantages accrue including the following. With a given exposed surface area on which the characters are exhibited, the diameter of the dials may be reduced approximately 50%, as compared with drums rotating on horizontal axes. Accordingly the inertia of the rotatable drums may be reduced approximately 75%, inasmuch as the inertia varies approximately as the square of the diameter. Also, notwithstanding the smaller size of the drum, the height of the characters may be conveniently increased by 25% over what is generally feasible with horizontally rotatable drums, so that legibility is substantially improved and the characters may be made of a more conventional and pleasing appearance. With the drum inertia thus greatly reduced, the working parts may be reduced in a generally corresponding ratio with an accompanying substantial improvement in speed and quietness of operation. The vertically rotatable drums may be positioned close together so that the digits of each quotation may be properly identified, yet a considerable space remains between the actual exhibited figures so that adjacent digits will not be confused even when observed from a considerable distance.

Figs. 18 and 19 have been drawn for illustrating the general appearance of typical brokers' boards as provided respectively with drums rotatable on vertical axes and as provided with horizontally mounted drums. In Figs. 18 and 19 the actual exposed drum surface areas are made as nearly equal as possible, yet it will be observed that nearly 20% more space must be devoted to each quotation with the drums rotatable on horizontal axes, as in Fig. 19.

Fig. 20 illustrates another form of a control switch which may be substituted for the cam operated switches above described. A conductive cam member is indicated at 146 which may be normally grounded through the drum shaft. This cam member is provided with an insulating insert 147 which, when the drum is in "normal" position, permits a spring contact member 148 to come into contact relationship with a contact member 149. The contact members 148 and 149 respectively may correspond to contacts 52 and 53 in the circuits first above explained.

While the invention has been described in detail with respect to certain preferred examples thereof which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent of the United States is:

1. A frame of the character described for supporting indicator units provided with downwardly extending positioning lugs on the side edges of their bases, said frame comprising vertical partitions for spacing corresponding indicator unit assemblies relating to different stocks, and horizontal partitions intersecting said vertical partitions for separately supporting indicator unit assemblies relating to the same stock or stocks, said latter partitions being formed with depressions to receive the lugs of adjacent indicator units to hold the indicator units in contact with each other, and with wider depressions at their intersections with the vertical partitions to receive the lugs of the indicator units in contact with the vertical partitions.

2. In combination, a frame of the character described for releasably supporting interchangeable indicator units, said frame comprising vertical partitions for spacing corresponding indicator unit assemblies relating to different stocks or other items, and horizontal partitions intersecting said vertical partitions for separately supporting indicator unit assemblies relating to the same stock or item, said latter partitions and said indicator units being formed with complemental projecting and recessed portions to maintain the indicator units in alinement and adjoining each other.

3. In combination, a frame of the character described for releasably supporting interchangeable indicator units, said frame comprising vertical partitions for spacing corresponding indicator unit assemblies relating to different stocks or other items, and horizontal partitions intersecting said vertical partitions for separately supporting indicator unit assemblies relating to the same stock or item, said latter partitions and said indicator units being formed with complemental projecting and recessed portions to maintain the indicator units in alinement and adjoining each other, and with wider portions at their intersections with the vertical partitions to receive the complemental portions of the indicator units in contact with the vertical partitions.

MERTON L. HASELTON.